No. 668,074. Patented Feb. 12, 1901.
W. O. WORTH.
MOTOR VEHICLE.
(Application filed Apr. 9, 1900.)

(No Model.) 6 Sheets—Sheet 1.

Witnesses:
Harry B. C. White.
R. White.

Inventor
William O. Worth,
By Toree Dain Attorney.

THE NORRIS PETERS CO., PHOTO-LITHO., WASHINGTON, D. C.

No. 668,074. Patented Feb. 12, 1901.
W. O. WORTH.
MOTOR VEHICLE.
(Application filed Apr. 9, 1900.)

(No Model.) 6 Sheets—Sheet 2.

No. 668,074. Patented Feb. 12, 1901.
W. O. WORTH.
MOTOR VEHICLE.
(Application filed Apr. 9, 1900.)
(No Model.) 6 Sheets—Sheet 5.

No. 668,074. Patented Feb. 12, 1901.
W. O. WORTH.
MOTOR VEHICLE.
(Application filed Apr. 9, 1900.)
(No Model.) 6 Sheets—Sheet 6.

Witnesses:
Inventor:
William O. Worth

United States Patent Office.

WILLIAM O. WORTH, OF CHICAGO, ILLINOIS, ASSIGNOR OF TWO-THIRDS TO WILLIAM R. DONALDSON, OF SAME PLACE, AND HENRY W. KELLOGG, OF BATTLE CREEK, MICHIGAN.

MOTOR-VEHICLE.

SPECIFICATION forming part of Letters Patent No. 668,074, dated February 12, 1901.

Original application filed August 14, 1899, Serial No. 727,159. Divided and this application filed April 9, 1900. Serial No. 12,199. (No model.)

*To all whom it may concern:*

Be it known that I, WILLIAM O. WORTH, a citizen of the United States, residing in Chicago, county of Cook, and State of Illinois, have invented certain new and useful Improvements in Motor-Vehicles; and I do hereby declare the following to be a full, clear, and exact description, such as will enable persons who are skilled in the art to which it appertains to make and use the same.

My invention relates to improvements in motor-vehicles, especially to propelling and controlling mechanism therefor.

This application is divided from the original filed August 14, 1899, Serial No. 727,159.

The object of my present invention is to provide an efficient, simple, and durable power-producing, transmitting, and controlling device adapted for motor-vehicles.

My power-producing prime mover may be operated at a constant speed, while the motion therefrom may be transmitted to the traction-wheels of the vehicle at a slow speed with a strong turning effort or torque or at a higher speed with relatively-decreasing torque. The arrangement is such that the vehicle may be driven rearwardly with all of the advantage and facility and with the same ease of control as when it is being propelled in a forward direction.

In the drawings.

The same letters of reference in all of the views indicate like parts.

In Figs. 1, 2, 3, 4, and 7 a frame A is shown, upon which the prime mover B (in this case a gasolene-engine) and the motive-power transmitting and controlling mechanism are mounted.

Neither the frame nor the engine is specifically claimed herein, but comprises the subject-matter of application for an explosive-engine filed June 19, 1899, Serial No. 721,078, and application for a motor-vehicle filed August 14, 1899, Serial No. 727,159.

The engine B is supported on the cross-pieces $a^2$ $a^3$ of the frame A. The fly-wheel $b^5$ of the engine projects laterally and inwardly from the side of the engine. The face of the fly-wheel farthest removed from the engine is covered with a suitable traction-surface, is turned or otherwise made true, and is adapted to drive a wheel which may be made to bear against its surface when the said wheel has its axis in line with the said surface and when the face of the said wheel is brought into contact therewith.

In Figs. 2, 3, 4, and 7 two brackets $c$ and $c'$ are shown fixed to the two cross-pieces $a^2$ and $a^3$ of the frame A. Bell-cranks $c^4$ $c^5$ are pivotally attached to the respective standards $c^6$ $c^7$, that are part of the bracket $c$ $c'$. The practically vertical arms of the bell-cranks carry bearings in which shaft $c^8$ is adapted to be revolved by means of the friction-wheel $c^9$. The horizontal arms of the bell-cranks $c^4$ $c^5$ each carry a segmental gear radiating from the pivots by which the said cranks are loosely attached to the standards $c^6$ $c^7$. Pinions $c^9$ $c^{10}$ are carried by and fixed to the shaft $c^{11}$. They mesh into the respective geared segments of the bell-crank arms $c^4$ $c^5$, Fig. 7.

Open-coil spiral springs $c^{12}$ $c^{13}$ (the latter shown in Fig. 7) exert a pressure sufficient to lift the segmental geared arms of the bell-cranks $c^4$ $c^5$, and thereby to separate the friction-wheel $c^9$ from contact with the driving-wheel $b^5$. At the same time the wheel $c^9$ is pressed into contact with the convex break-bar $c^{14}$, (made, preferably, of wood,) which forms, with the wheel $c^9$, the two elements of a braking mechanism adapted to arrest the motion of the moving parts when the driven wheel is not held in contact with the driving-wheel $b^5$. This shaft $c^8$ is free to be revolved in the bearings provided in the arms of the bell-cranks $c^4$ $c^5$. This shaft may be square between the bearings to provide a means whereby it may be positively driven by the driven wheel $c^9$, which has a sliding bearing thereon.

In the drawings I have shown a round shaft provided with a fixed feather $c^{15}$, that projects from a spline that is cut in the shaft and which extends between the bearings thereof. The driven disk or wheel $c^9$, having an extended hub $c^{16}$ bored to fit the shaft $c^8$, is provided with a feather-way cut longitudinally through the said hub, so that the disk $c^9$ may be freely moved along the said shaft and feather $c^{15}$ to any point between the bearings thereof.

It will be seen that the disk $c^9$ cannot be revolved without revolving the shaft $c^8$, in virtue of the feather $c^{15}$ and feather-way in the said disk. A shaft $c^{17}$ is supported in bearings $c^{18}$ at one end and to a chain $c^{19}$ at the remaining end and is free to be reciprocated thereby. The end nearest the disk $c^9$ turns down, is forked, and is loosely attached to a collar $c^{20}$. (Shown in enlarged section in Fig. 5.) This collar is placed within an annular groove cut into the hub $c^{16}$ of the disk $c^9$. Pins in the said fork loosely engage within perforations $c^{21}$ $c^{22}$ of the said collar for the purpose of sliding the said collar, hub, and disk along the shaft $c^8$. An annular groove $c^{23}$ is provided within the body of the collar for the purpose of containing lubricating material, such as hard grease or the like, adapted to supply lubrication to the frictional parts connected thereto, as is plainly apparent from an examination of the construction. A closure $c^{24}$ provides a means for filling the receptacle $c^{23}$. Openings on the sides of the collar (not shown) permit the grease to flow out when heated.

Figure 1:
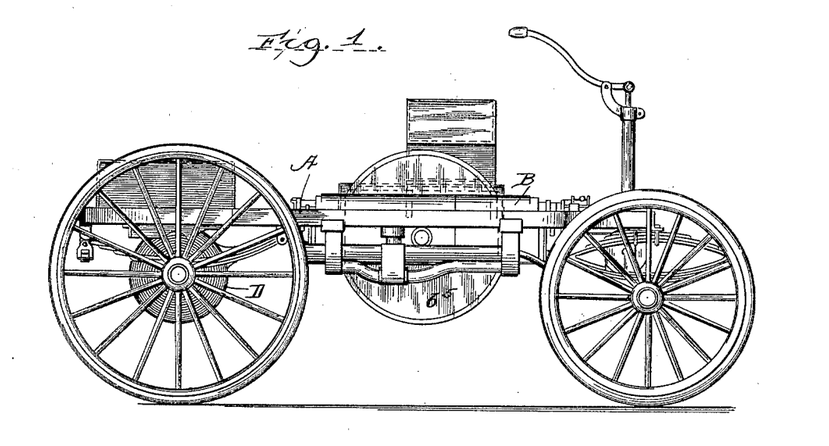
Figure 1 is a side elevation of the running-gear, showing the propelling mechanism mounted thereon, the body of the vehicle being removed.
Figure 2:
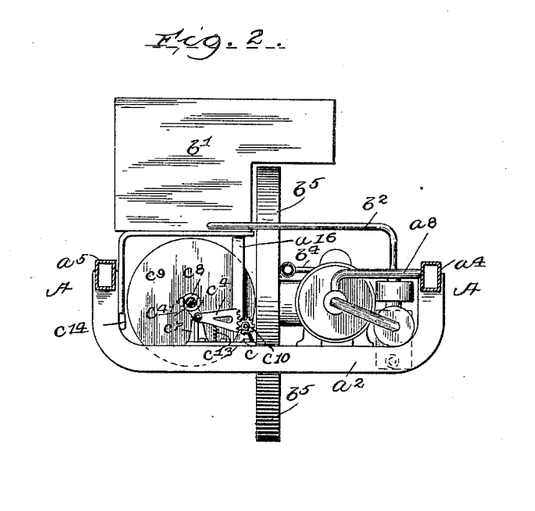
Fig. 2 is a section taken through line 2 of Fig. 3.
Figure 3:
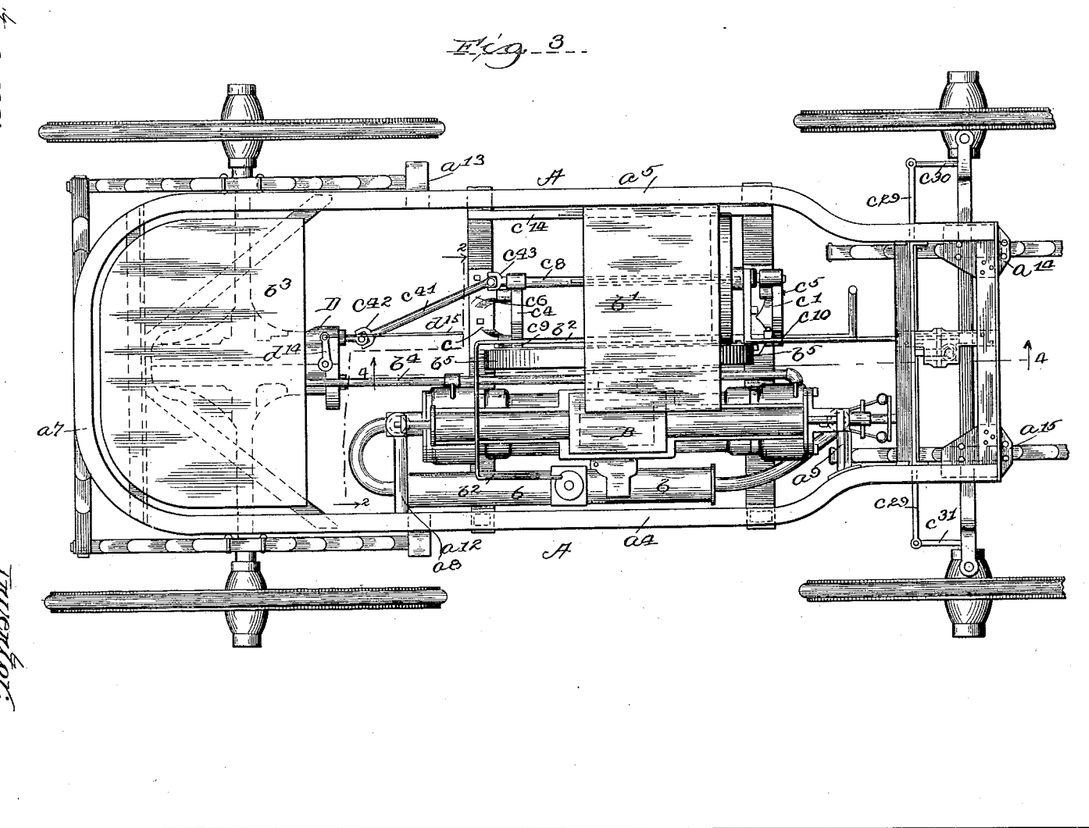
Fig. 3 is a plan view of the mechanism and running-gear with the body of the vehicle removed.
Figures 4, 5:
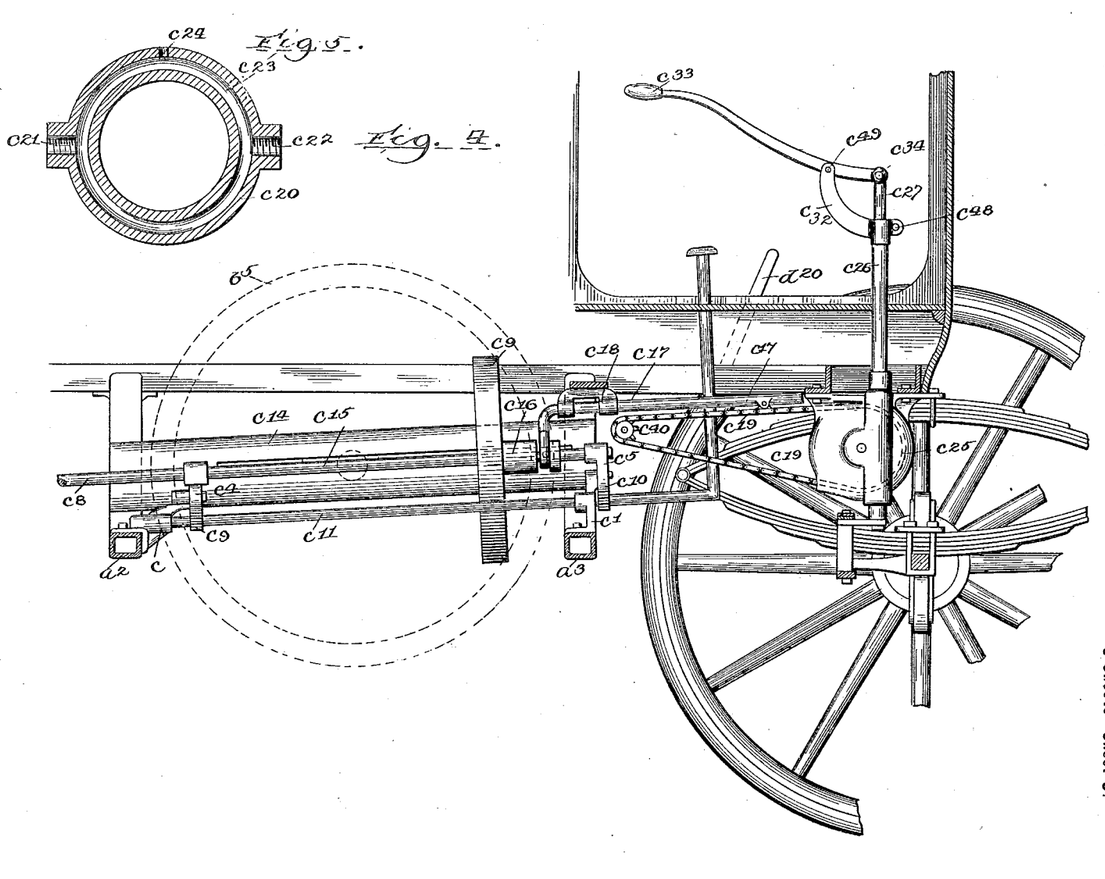
Fig. 4 is a broken-away side elevation, partly in section, taken on lines 4 4 of Fig. 3.
Fig. 5 is an enlarged detail view of a collar, showing a lubrication-containing receptacle.
Figure 6:
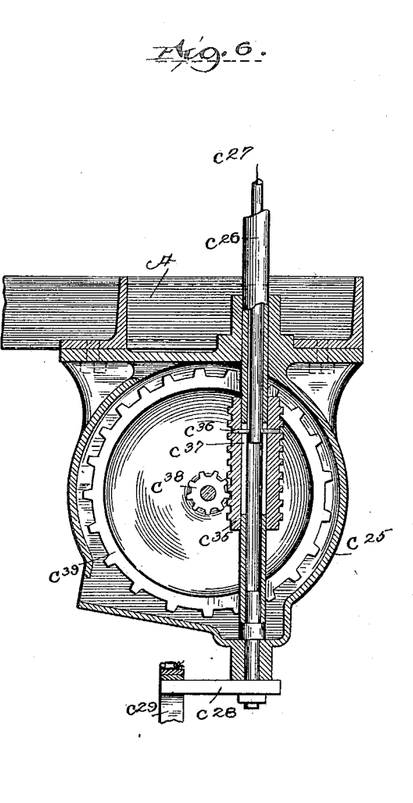
Fig. 6 is an enlarged sectional detail view showing more specifically the means employed for changing the speed of the vehicle.

In Figs. 4 and 6 an inclosing case $c^{25}$ is attached to the lower side of a forward portion of the frame A. Passing vertically through the case a composite shaft $c^{26}$ $c^{27}$ rises. The former is adapted to be rotated only and the latter rotated therewith and reciprocated therein. The lower end of $c^{26}$ is fixed to an arm $c^{28}$, which operates the steering-gear that is attached to the two forward wheels, consisting of the levers $c^{29}$, $c^{30}$, and $c^{31}$. (See Fig. 3.) An extension $c^{32}$ from the upper end of tube $c^{26}$ forms a fulcrum for the lever $c^{33}$. The latter is connected to the reciprocating shaft by a universal ball-joint $c^{34}$. The handle portion of the steering-gear $c^{32}$ and $c^{33}$ is made separable, so that the body of the vehicle may be easily and quickly taken from the supporting-frame when this handle has been removed. The ball $c^{34}$ is perforated. Into this perforation a loosely-fitting pin $c^{44}$ is placed. The ball is also slotted, as shown at $c^{45}$ in Fig. 12. The lever $c^{33}$ is flattened near the end and terminates in a reduced cylindrical extension $c^{46}$. This pin-like extension engages with the pin $c^{44}$ through a hole made through its diameter, thus forming a guide for the handle $c^{33}$ and a means by which shaft $c^{27}$ may be vertically reciprocated by the handle $c^{33}$. The arm $c^{32}$ may be clasped tightly around the hollow shaft $c^{26}$ by means of the bolt $c^{47}$ and nut $c^{48}$. (Shown in Figs. 11 and 14.)

Figures 11, 14:
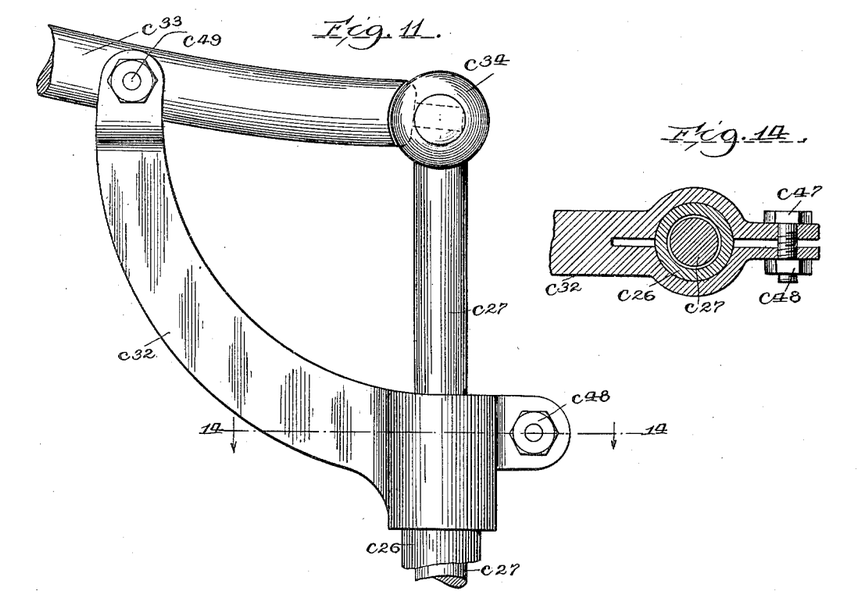
Fig. 11 is an enlarged broken-away detail view of the removable handle for operating the steering-gear.
Fig. 14 is a section taken through line 14 14 of Fig. 11.
Figure 12:
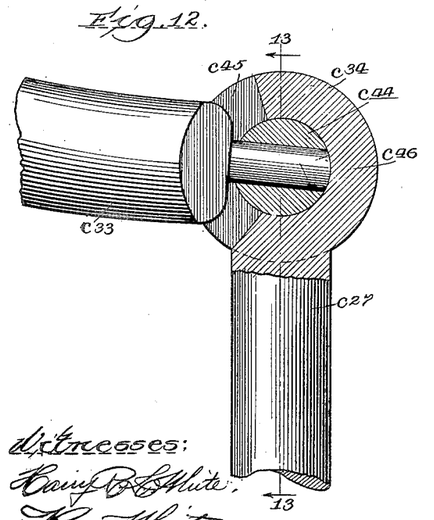
Fig. 12 is a section of $c^{34}$, taken through lines 12 12 of Fig. 13.
Figure 13:
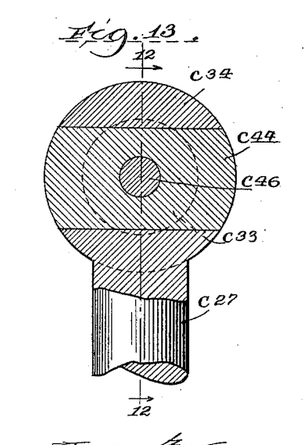
Fig. 13 is a section of same, taken through line 13 13 of Fig. 12.

To remove the handle-bar, loosen nut $c^{48}$ and remove pin $c^{49}$ in the extension $c^{32}$, when the handle $c^{33}$ may be readily removed from the ball $c^{34}$. The piece $c^{32}$ may then be slipped over the top of the ball $c^{34}$.

Within the case $c^{25}$ a cylindrical rack $c^{35}$ surrounds the hollow shaft $c^{26}$ and is free to move vertically thereon. This rack is fixed to the internal shaft $c^{27}$ by means of a pin $c^{36}$, which passes freely through a slot $c^{37}$ in the hollow shaft. A pinion $c^{38}$ is fixed to the sprocket-wheel $c^{39}$. A chain $c^{19}$ passes over the sprocket-wheel $c^{39}$ and is held in longitudinal position by pinion $c^{40}$. The upper portion of the chain is fixed to the reciprocating rod $c^{17}$.

Referring now to Fig. 3, the power produced by the revolutions of the shaft $c^8$ is transmitted through the oblique-positioned shaft $c^{41}$ to the power-distributer D, the shaft $c^{41}$ being in this instance flexibly connected by means of the universal joints $c^{42}$ $c^{43}$, as shown.

Figure 8:
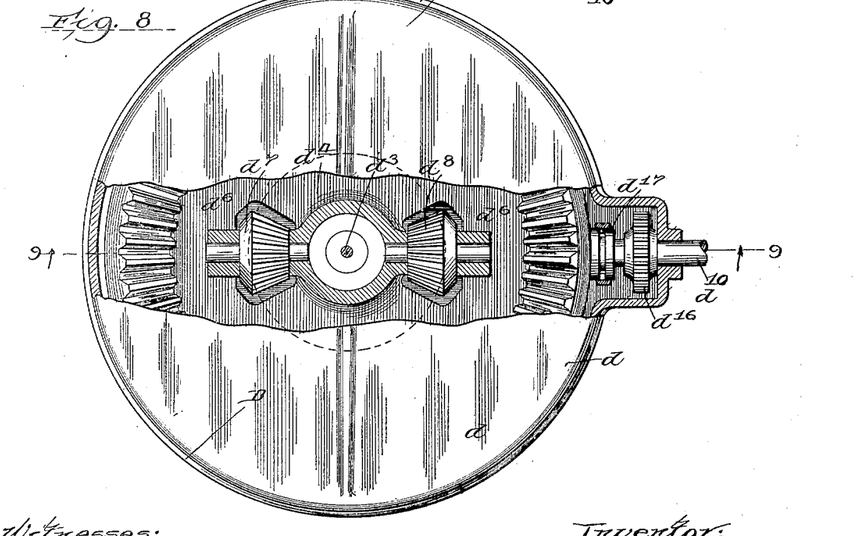
Fig. 8 is a broken-away elevation showing an enlarged detail view of the mechanism through which the propelling power is transmitted from the prime mover to the traction-wheels.
Figures 9, 10:
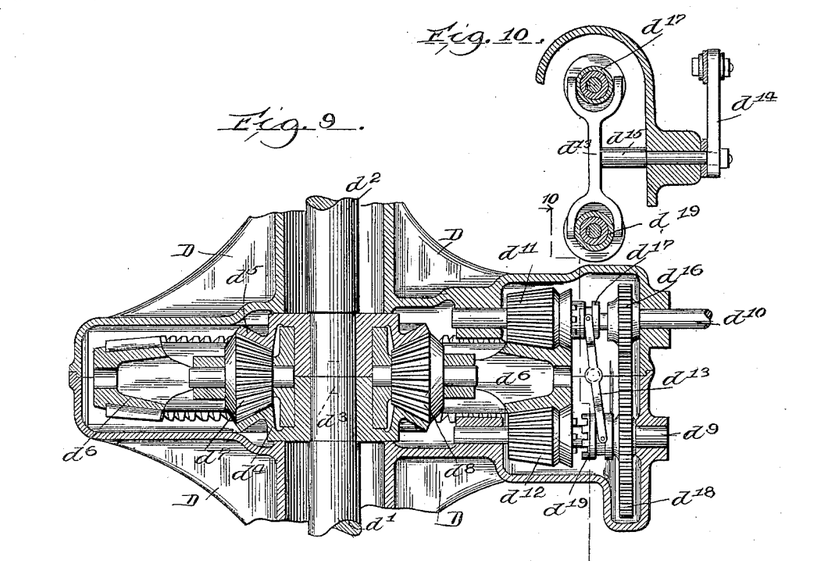
Fig. 9 is a section taken through line 9 9 of Fig. 8.
Fig. 10 is a section of the shifting device, taken through lines 10 10 of Fig. 9.

The distributer D is shown only in outline in Fig. 3, but is more plainly revealed in Figs. 8, 9, and 10, to which I now refer.

The device is contained within an inclosed case $d$. (Shown broken away in Fig. 8.) The shafts $d'$ $d^2$ are each separately and rigidly connected to a respective traction-wheel. They are held in line within the case by means of a central guide-pin $d^3$. To each shaft a bevel-gear $d^4$ $d^5$ is respectively fixed. (Shown in outline also in Fig. 8.) A double-beveled two-faced gear-wheel $d^6$ has a bearing upon the two inner-facing hubs of the bevel-gears $d^4$ $d^5$. The wheel $d^6$ carries two revoluble pinions $d^7$ $d^8$. Both sides of each pinion mesh into both gear-wheels $d^4$ $d^5$. Two shafts $d^9$ $d^{10}$, with their axis at right angles to that of the wheel $d^6$ and provided with bearings within the inclosed case $d$, are located therein. Shaft $d^{10}$ carries a bevel gear-pinion $d^{11}$. Shaft $d^9$ carries a similar pinion loosely revolved thereon, each pinion being adapted to be temporarily fixed to its respective shaft by the double clutch mechanism $d^{13}$, Fig. 10. The crank-arm $d^{14}$, by means of the shaft $d^{15}$, vibrates the yoke-piece that controls the position of the clutch members, so that either of the pinions $d^{11}$ or $d^{12}$ may be placed in driving relation with their respective shafts. To the shaft $d^{10}$ a gear-wheel $d^{16}$ is fixedly attached. Between this wheel and the pinion $d^{11}$ a feather is placed in the shaft. The collar $d^{17}$, which forms one element of the clutch, is free to slide, but adapted to be positively driven thereby. Another element of the clutch is formed upon the opposite end of the pinion $d^{11}$, which is free to revolve on the shaft. A gear-wheel $d^{18}$ is also fixed to shaft $d^9$, and the associated clutch is of similar construction to that just described, the collar $d^{19}$ and pinion $d^{12}$ forming the members of this clutch. A pivoted yoke-arm $d^{13}$ is adapted to reciprocate the two collars $d^{17} d^{19}$ along their respective shaft $d^{15}$ and arm $d^{14}$. The gear-wheels $d^{16}$ and $d^{18}$ may be of any respective suitable size in order to secure the change of speed desired when driving directly through shaft $d^{10}$ or by reducing or increasing the speed and driving through shaft $d^9$.

Figure 7:
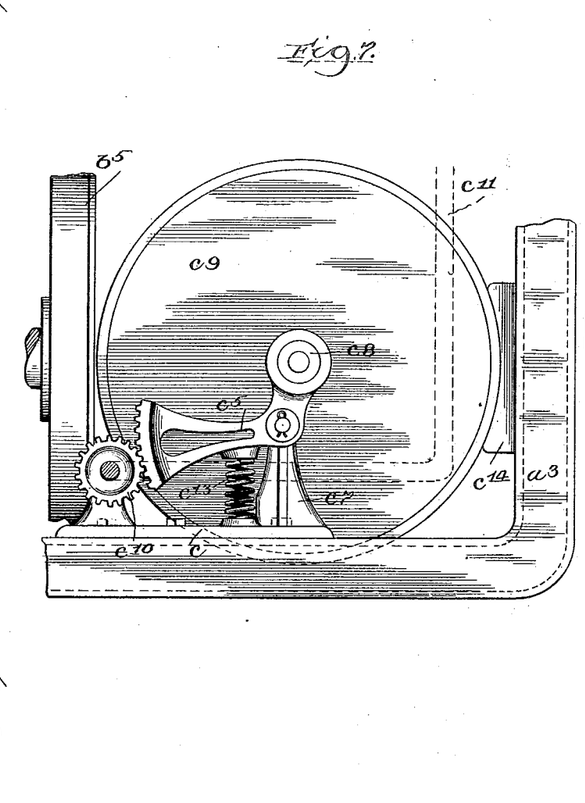
Fig. 7 is an enlarged detail view of the driving-disk, the shafting, driven disk, and the brake for arresting the motion of the latter when it is not in operative contact with the former.

The operation of my device is as follows: When the engine is in motion, the fly-wheel $b^5$ is revolved thereby; but no motion is imparted to the running-gear of the vehicle until disk $c^9$ has been brought into frictional contact with the driving-wheel $b^5$. When it is desirable to impart motion to the running-gear of the vehicle, pressure is exerted upon the top of the shaft $c^{11}$, as when it is depressed by the application of the foot. Referring to Fig. 7, it will be seen that the effect of depressing the shaft $c^{11}$ rotates pinions $c^9$ and $c^{10}$ slightly. Segmental crank-arms of the bell-cranks $c^4 c^5$ are depressed against the resilience of the spiral open springs $c^{12} c^{13}$, and the wheel $c^9$, that is pendently carried by the vertical arms of the bell-cranks $c^4 c^5$ on the shaft $c^8$, is thereby laterally moved into contact with driving-wheel $b^5$ and away from the stationary brake-surface $c^{14}$. The friction existing between the respective surfaces of the driving-wheel $b^5$ and the driven disk-wheel $c^9$ causes the latter to be revolved. The greater the coefficient of friction the more positively will the power be imparted from the driver to the driven. When the pressure is removed from the shaft $c^{11}$, the springs $c^{12} c^{13}$ automatically remove the disk $c^9$ from contact with driving-wheel $b^5$ and press it into contact with stationary braking-surface $c^{14}$, which tends to arrest the velocity of the disk $c^9$, and thereby the vehicle is brought to a stop. While the disk $c^9$ is being revolved in the manner described, the shafts $c^8$, $c^{41}$, and $d^{10}$ are also revolved, and thereby the traction - wheels through the distributer D. The speed at which the disk $c^9$ will be driven by the driving-wheel $b^5$ is governed by the position that the said disk occupies at the time along the shaft $c^8$ with reference to the distance from the center of the driver $b^5$. When the driver is turned in a given direction, the farther removed from the center of the said driver, where the said disk has contact with the face thereof, the greater speed the disk will be driven, and, conversely, the nearer to the center the contact of said disk is made with said driver the more slowly, but more powerfully, will the said disk be driven, and thereby the connecting mechanism. If the said disk should pass the center of the said driver and be made to make contact on the opposite side of its axis, the direction of rotation of said disk will be reversed. The disk $c^9$ may be made to occupy any desired position with reference to the axis of the driver $b^5$ by means of the lever $c^{33}$ of the controlling device. When lever $c^{33}$ is raised to its highest point, shaft $c^{27}$, which carries rack $c^{35}$, is thereby depressed, pinion $c^{38}$ is revolved, and the top of the sprocket-wheel carrying the chain $c^{19}$ is moved forward. The rod or shaft $c^{17}$ is attached to the top part of chain $c^{19}$ and is thereby moved ahead. The bent forked end of rod $c^{17}$ engages with the loose collar $c^{20}$, which is carried in an annular groove of the hub $c^{16}$, and thereby the wheel $c^9$ is also moved forward or toward a point where it will make contact with the longest radius of the driver $b^5$. By lowering the handle $c^{33}$ the disk $c^9$ may be moved in like manner toward the center of the driver $b^5$ for the purpose of slowing up the speed and increasing the moving effort of the vehicle. When the disk is thus moved beyond the center of the driver $b^5$, the direction of the vehicle will be reversed, as will be readily understood. When the handle $c^{33}$ is moved in an arc of a circle whose center is the axis of the composite shaft $c^{27} c^{26}$, the steering mechanism connecting the front traction-wheels with the said handle is brought into action for changing the position of the said traction-wheels for the purpose of changing the direction of the vehicle.

The power-distributer D, Figs. 8, 9, and 10, has heretofore been described. When the clutch occupies the position shown in Fig. 9, the power received on shaft $d^{10}$ will be transmitted directly to pinion $d^{11}$ through the clutch-collar $d^{17}$, and the revolutions that the shaft $d' d^2$ will turn in a given time will be in proportion to the relative diameters of the gear-wheel $d^6$ and the pinion $d^{11}$. When the clutch-collar $d^{19}$ is thrown into contact with the pinion $d^{12}$, a reduction of speed will be effected through the gear-wheels $d^{16}$ and $d^{18}$, and the shaft $d' d^2$ will be turned as much slower or faster as the relation of the two gear-wheels $d^{16} d^{18}$ differs in diameter. If the smaller one is carried by the shaft $d^{10}$, then the shafts $d'$ $d^2$ will be turned proportionately, as to the two gear-wheel diameters, slower. If the shaft $d^{10}$ carries the larger of the two wheels, there will be a relative increase of speed of the shafts $d'$ $d^2$ in the same proportion. The arm $d^{14}$ of the shifting mechanism may be connected by a rod to the shifting-lever $d^{20}$. (Shown in Fig. 4.) When the gear-wheel $d^6$ is driven by either pinion $d^{11}$ or $d^{12}$, the power therefrom is transmitted to the two traction-wheel shafts $d^7$ and $d^8$ and the two gear-wheels $d^4$ and $d^5$. When both shafts $d'$ and $d^2$ offer equal resistance, as when both driving-wheels attached thereto are in condition to be propelled with equal facility, the relation between the gear-wheels $d^4$ $d^5$ and the pinions $d^7$ $d^8$ remains unchanged, while the shafts $d'$ $d^2$ are propelled directly by the revolution of the bevel gear-wheel $d^6$ and the power is distributed equally to the two shafts $d'$ $d^2$ and their respective driving-wheels. If one wheel should meet with more resistance than the other, as when turning a curve, the wheel on the largest radius would be turned more rapidly than the one impeding the distributer, acting through the gearing just described, to drive the wheel at the longest radius, as if turned from a fulcrum provided by the impeded wheel in a manner plainly apparent.

I have plainly described my motor-vehicle and have shown the elements necessary to its operation; but I do not wish to be held strictly to the construction shown, as a considerable latitude of variation may be made in the different parts without departing from the spirit and scope of my invention.

I claim—

1. A motor-vehicle comprising a frame, an engine mounted thereon, a driving or fly wheel of said engine provided with a friction-surface, in a plane at right angles to its axis, a shaft parallel with the said friction-surface, a guide extending along the length of said shaft, a friction-disk mounted on said shaft, free to be moved along the length thereof, but held from turning on said shaft by said guide, a pendant, pivoted frame, containing bearings, for each end of said shaft, pivots upon which said frame is adapted to be oscillated, a geared segment extension from said frame, a shaft, a pinion on said shaft meshing into said geared segment, and a means for rotating said shaft whereby the said frame is moved or rotated on its pivots, to a position nearer or farther from the said fly-wheel and thereby the said friction-disk is brought into contact, or withdrawn from contact with the friction-surface of the said driving friction fly-wheel, substantially as set forth.

2. A motor-vehicle comprising a frame, an engine mounted thereon, a driving or fly wheel of said engine provided with a friction-surface, in a plane at right angles to its axis, a shaft parallel with said friction-surface, a friction-disk rotatably attached to said shaft, but free to be moved along the length thereof, a pivoted frame provided with bearings for each end of said shaft, a stationary brake-shoe along the reciprocating path of said friction-disk, a lever extending to the forward portion of said vehicle for forcing said friction-disk into contact with said driving or fly wheel, and a spring exerting a pressure against said frame and adapted to force said friction-disk into contact with said stationary brake-shoe when pressure upon said frame has been released, substantially as set forth.

3. A motor-vehicle comprising a prime mover, such as an engine, a disk rotated by said engine, a transmitting mechanism detachably associated with said engine, a driver attached to the said mechanism adapted to be shifted laterally in front of said disk, traction-wheels for the said vehicle connected to said transmitting mechanism, a brake composed of a stationary friction-surface extending along the reciprocating path of said friction shifting element of the transmitting mechanism, a spring adapted to force the said shifting element and stationary friction-surface in contact, and a lever, or the like, whereby said driven element is placed in operative relation with said engine, substantially as set forth.

4. A motor-vehicle comprising a prime mover, a transmitting mechanism connected with the traction-wheels of the said vehicle, an intermediate shifting speed-changing friction-disk, between said prime mover and transmitting mechanism, a steering and speed-controlling device susceptible of two independent motions, one element of said device comprising a rack, a pinion into which said rack meshes, a chain reciprocated by said pinion, a lever or rod attached to said chain, said rod, or lever being connected to said speed-changing friction-disk, and the other element of said steering device to the wheels of said vehicle, substantially as set forth.

5. A motor-vehicle comprising a power-distributing device consisting of shafts $d'$ $d^2$, bevel gear-wheels $d^4$ $d^5$ fixed on the ends of the respective shafts, a double-faced bevel gear-wheel $d^6$ adapted to be revolved around said shafts, two or more pinions $d^7$ $d^8$ carried by the wheel $d^6$ and meshing into said bevel gear-wheels $d^4$ $d^5$, two shafts $d^9$ $d^{10}$ each carrying a bevel gear-pinion $d^{11}$ $d^{12}$ loosely thereon and both meshing with the double-faced bevel gear-wheel $d^6$, a series of wheels connecting said shafts together, and a clutch for each of the said pinions, whereby either of said pinions may be made fast to its respective shaft, substantially as set forth.

6. A motor-vehicle comprising a removable vehicle-body, a steering-gear and speed-controlling device associated with the said vehicle, a composite shaft connected to the said steering-gear and speed-controlling device and extending above the bottom of the said body, a handle removably attached to said shaft, a bracket, the outer shaft for supporting said handle, and a loose sliding joint between the end of said handle and the said interior shaft, substantially as set forth.

In testimony whereof I have signed this specification, in the presence of two subscribing witnesses, this 4th day of April, 1900.

WILLIAM O. WORTH.

Witnesses:
 FORÉE BAIN,
 M. F. ALLEN.